US007865602B2

(12) United States Patent
Garcia-Martin

(10) Patent No.: US 7,865,602 B2
(45) Date of Patent: Jan. 4, 2011

(54) SYSTEM, METHOD, AND NETWORK ELEMENTS FOR PROVIDING A SERVICE SUCH AS AN ADVICE OF CHARGE SUPPLEMENTARY SERVICE IN A COMMUNICATION NETWORK

(75) Inventor: Miguel Garcia-Martin, Helsinki (FI)

(73) Assignee: Nokia Siemens Networks Oy, Espoo (FI)

( * ) Notice: Subject to any disclaimer, the term of this patent is extended or adjusted under 35 U.S.C. 154(b) by 1101 days.

(21) Appl. No.: 11/122,018

(22) Filed: May 5, 2005

(65) Prior Publication Data
US 2006/0212511 A1 Sep. 21, 2006

(30) Foreign Application Priority Data
Feb. 23, 2005 (EP) ................................. 05003946

(51) Int. Cl.
*G06F 15/16* (2006.01)
(52) U.S. Cl. ........................ 709/227; 709/229; 379/29.1
(58) Field of Classification Search ................ 379/29.1, 379/100.04, 114.01, 114.03; 709/227, 229
See application file for complete search history.

(56) References Cited

U.S. PATENT DOCUMENTS

| | | | | | |
|---|---|---|---|---|---|
| 5,915,005 | A | * | 6/1999 | He .......................... | 379/115.01 |
| 5,978,455 | A | * | 11/1999 | Johnson et al. ............. | 379/111 |
| 6,018,652 | A | * | 1/2000 | Frager et al. ................ | 455/406 |
| 6,807,431 | B2 | * | 10/2004 | Sayers et al. ................ | 455/555 |
| 6,934,527 | B1 | * | 8/2005 | Hamada ..................... | 455/405 |
| 7,020,261 | B2 | * | 3/2006 | McGrath et al. ....... | 379/218.01 |
| 7,200,381 | B2 | * | 4/2007 | Halkosaari et al. .......... | 455/405 |
| 2001/0012772 | A1 | * | 8/2001 | Cox et al. .................... | 455/406 |
| 2002/0098827 | A1 | * | 7/2002 | Nilsson ....................... | 455/406 |
| 2002/0178385 | A1 | * | 11/2002 | Dent et al. ................... | 713/202 |
| 2003/0032404 | A1 | * | 2/2003 | Wager et al. ................ | 455/406 |
| 2004/0139152 | A1 | * | 7/2004 | Kaler et al. ................. | 709/203 |
| 2004/0185826 | A1 | * | 9/2004 | Koskinen et al. ............ | 455/406 |
| 2004/0190718 | A1 | * | 9/2004 | Dacosta ...................... | 380/247 |
| 2004/0196816 | A1 | * | 10/2004 | Koskinen et al. ............ | 370/338 |
| 2005/0129208 | A1 | * | 6/2005 | McGrath et al. ....... | 379/218.01 |
| 2005/0138355 | A1 | * | 6/2005 | Chen et al. .................. | 713/155 |

(Continued)

OTHER PUBLICATIONS

Anna Martinez Rebordosa "NGN Simulation Service AOC: solution analysis" 05TD047 T-Com Headquarters Technology Engineering; 26 pages, Jan. 17-21, 2005.

(Continued)

*Primary Examiner*—Ario Etienne
*Assistant Examiner*—Sargon N Nano
(74) *Attorney, Agent, or Firm*—Squire, Sanders & Dempsey L.L.P.

(57) ABSTRACT

The invention provides a system, method, and network elements for providing a service, preferably an advice of charge, AoC, service requested by a user equipment at a session set-up or during a session. An application server provides information for the requested service to the user equipment. In an embodiment, authorization information and the information for the requested service may be sent to the user equipment. Depending on an input by the user or other type of confirmation such as expiration of a timer, the user equipment may initiate continuation of the session, for example by generating an authorization response based on the received authorization information, and sending the generated authorization response to the application server for verification.

39 Claims, 4 Drawing Sheets

U.S. PATENT DOCUMENTS

2007/0208936 A1* 9/2007 Ramos Robles ............ 713/168

OTHER PUBLICATIONS

Draft ETSI TS <3030> V<0.0.2> (Nov. 2004) "Telecommunications and Internet Converged Services and Protocols for Advanced Network" NGN Basic Supplementary Services NGN Signaling Control Protocol; 26 pages, Jun. 2006.

Anna Martinez Rebordosa "NGN Simulation Service AOC: solution analysis" Deutsche Telekom AG; ETSI TISPAN#05; Sophia Antipolis; Jan. 17-21, 2005; 05TD047; 2 pages.

"Updates to TS 3030 v 0.0.2 (Advice of Charge)" LM Ericsson; ETSI TISPAN#05; Sophia Antipolis, Jan. 17-21, 2005; 05TD137; 2 pages.

* cited by examiner

SYSTEM, METHOD, AND NETWORK ELEMENTS FOR PROVIDING A SERVICE SUCH AS AN ADVICE OF CHARGE SUPPLEMENTARY SERVICE IN A COMMUNICATION NETWORK

FIELD AND BACKGROUND OF THE INVENTION

The present invention relates to a system, method, and network elements for providing a service such as a Supplementary Service, preferably an Advice of Charge, AoC, Supplementary Service. The service may preferably be provided with or for another service such as a communication service which may e.g. be a voice communication service, a data communication service, a multimedia communication service, etc. The supplementary service and the communication service are provided in a communication network with a suitable protocol, preferably Session Initiation Protocol, SIP, and preferable in a SIP network such as the IP Multimedia Subsystem (IMS).

Document Draft ETSI TS<3030> V<0.0.3> (2004-11) describes a proposal for providing an Advice of Charge, AoC, service as a supplementary service in a mobile communication network using Session Initiation Protocol (SIP). For circuit switched networks the service has been standardised by International Telecommunication Union (ITU) early 1990s (in standards 1.256.2a-c (3/93) and Q.86 (10/95), GSM 02.86, 03.86, 04.86, and 3GPP 22.086, 23.086, and 24.086). The AoC service provides a charging information at communication set-up time (AOC-S), or communication end. The AoC at communication set-up supplementary service provides the served user with information about the charging rates at the time of communication establishment or during the communication in the case of charging rates changes. The charge information given relates to the charges incurred on the network to which the served user is attached. The supplementary service may apply for both originating and terminating calls, e.g., roaming leg.

An advantageous implementation of the AoC service should provide the originator of the session to provide her/his "go ahead" with the session setup once she/he has been informed of the potential charges and has agreed with them. Such a function is difficult to implement. When trying to implement this function with SIP SUBSCRIBE/NOTIFY methods, INFO or MESSAGE for notifications, or even notifications embedded in a provisional response, difficulties arise. An S-CSCF would, in some cases, have to "hold" the processing of an INVITE request until some event happens such as perhaps the reception of a NOTIFY from an Application Server, AS, indicating the charge. This concept is difficult to implement since it requires correlating messages belonging to different dialogs. Furthermore, it requires changes to the S-CSCF since part of the AoC logic is to be implemented in the S-CSCF, and part in the AoC Application Server. This approach also contradicts the idea of implementing the logic of the service in dedicated application servers, and keeping the S-CSCF with the original routing and triggering functions.

Further, an alternative concept based on an AoC AS acting as a Back-to-Back User Agent, B2BUA, would undesirably require implementing the B2BUA with additional logic to correlate two dialogs on two different sides (like sequence numbers, From/To headers, etc.). Additionally it would prevent the use of any kind of end-to-end security (S/MIME), and thus prevent the use of extensions that are otherwise required to be understood by user agents.

SUMMARY OF THE INVENTION

The present invention provides a solution for solving or at least relieving the above problems either partly or entirely.

According to one aspect, the invention provides a system as defined in claim 1, or any one of the dependent system claims. According to a further aspect, the invention provides a method as defined in the independent method claim, or any one of the dependent method claims. The invention additionally provides, according to further claims, network elements equipped for providing the service in accordance with the invention.

The invention proposes an implementation of a service or supplementary service such as the Advice of Charge, AoC, service that is compliant with current requirements and standards.

The invention is preferably implemented in or for a mobile communication network.

Generally, a communication service can be provided by SIP requests such as INVITE, SUBSCRIBE, MESSAGE, PUBLISH, etc., or by any other appropriate service providing or setting up a communication or session, such as a call, with another entity. A supplementary service can, e.g., be an Advice of Charge.

In accordance with the invention, a service such as an AoC supplementary service is provided in a reliable manner. A user initiating, or receiving, a session requesting the service such as AoC service can receive accurate information of the charges incurred by such session attempt. Once the user has been informed of the potential charges, the user is provided with means or functions to indicate whether she/he wants to proceed with the session set-up or not. Additionally, the service can provide further more accurate information during the duration of the session or communication, when such more accurate charging information becomes available.

Generally, without restriction thereto, the invention relates to the SIP area, IP Multimedia Subsystem, IMS, NGN, Next Generation Networks, and the implementation of Supplementary Services with SIP. Particularly, but without restriction thereto, it applies to the implementation of the Advice of Charge Supplementary Service with SIP.

DETAILED DESCRIPTION OF EMBODIMENTS OF THE INVENTION

Figure 1:
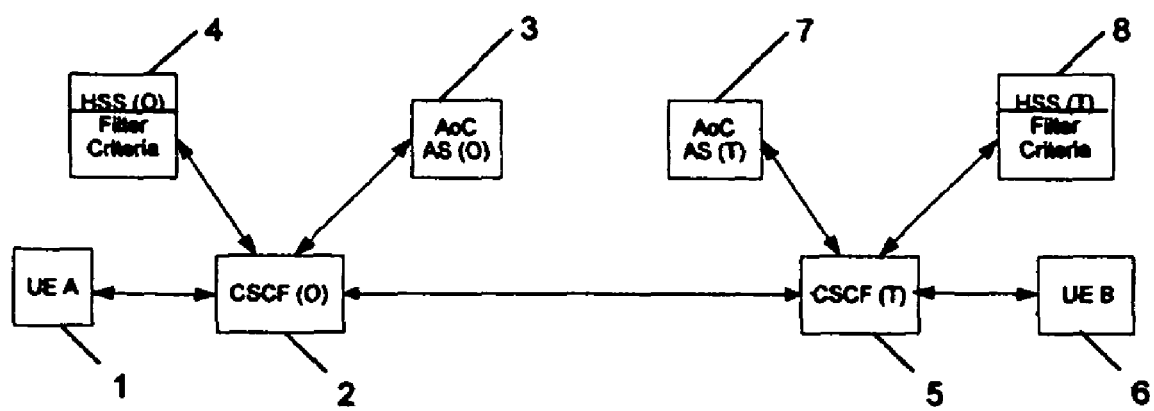
FIG. 1 shows a basic structure of an embodiment of a system, method, and devices in accordance with the invention.

FIG. 1 shows a basic structure of an embodiment of a system in accordance with the invention. The communication network is, in this and the other embodiments, preferably a mobile communication network. The embodiment provides an implementation of a service which in this embodiment is an Advice of Charge, AoC, service. The embodiment includes, for the originating side initiating a communication or session request, a Call/Session Control Function, CSCF (O), 2 provided for a User Equipment, UE A, 1, originating a communication or session request, an application server, AoC AS (O), 3, for the originating UE 1, and a Home Subscriber Server, HSS (O), 4, associated with the UE 1. In a similar manner, the terminating side, to which the originated communication or session is directed, includes a Call/Session Control Function, CSCF (T), 5, provided for a User Equipment, UE (UE B), 6, intended to receive the requested communication or session, an application server, AoC AS (T), 7 assigned to the UE 6, and a Home Subscriber Server, HSS (T), 8, associated with the UE 6. The letters "O" and "T" added to the components 2 to 5, 7, 8 stand for the "originating" and "terminating" side. The double-headed arrows illustrate the message flows between the elements. The Call/Session Control Functions, CSCF, 2, 5, preferably act, or are implemented as, Serving CSCFs according to the IMS architecture, behaving as SIP servers. SIP stands for Session Initiation Protocol.

The HSS 4 and 8 store filter criteria, in particular initial filter criteria set for the users or UEs assigned to the respective HSS. The filter criteria determine the services that will be provided to each user. Generally, when a user, e.g., UE 1, registers to an IMS network, the Serving Call/Session Control Function, S-CSCF, e.g., CSCF 2 contacts the HSS 4 to download authentication vectors and the initial filter criteria. The initial filter criteria contains a collection of conditions that determine when a particular request has to be forwarded to a particular application server, e.g. a Call-Forwarding Application Server, or in the present case to AoC AS 3, or AoC AS 7.

In the embodiment, there are two modes of operation, namely a permanent mode in which the user requires AoC information for all the sessions, and a temporary mode in which the user will select those SIP requests for which it requires AoC information. The temporary mode is signaled from the UE 1, or 6, that will insert a request for the service into the protocol. For instance, the UE can insert a P-AoC header field in the SIP request in order to request the execution of the Advice of Charge service. In permanent mode the UE need not specifically request the service, since it is already known and stored by network elements that such service is always requested.

In temporary mode, the filter criterion will indicate that whenever a user-originated SIP request contains a the information element selected for the service, such as a P-AoC header field for the Advice of Charge service, the request will be forwarded to the AoC AS 3 that will provide the service logic. In permanent mode, the filter criterion will indicate that all the user-originated SIP requests will be forwarded unconditionally to the AoC AS 3.

In accordance with embodiments of the invention, the Application Server, AS, 3 is an Advice of Charge, AoC, Application Server 3 which can act as both SIP proxy server (for accountable traffic, e.g., INVITE) and SIP User Agent (for sending MESSAGE requests containing charging information to the user of UE 1). In a similar manner, the Application Server, AS, 7 can be an Advice of Charge, AoC, Application Server which can act as both SIP proxy server (for accountable traffic, e.g., INVITE) and SIP User Agent (for sending MESSAGE requests to the user of UE 6) so as to cope with a session destined towards UE 6.

Those SIP requests that require the network to inform the user of UE 1 about the potential charge, are routed to this AoC AS 3. The AS 3 carries out a twofold operation. It gathers the charging information and sends it to the user of UE 1 in a MESSAGE request. Further, if the user has requested to confirm to proceed with the charge, then the AoC AS 3 treats the SIP request (e.g., the INVITE) as an unauthenticated request, and therefore, requests authorization from the user of UE 1 to proceed with the routing of the request.

This authorization is preferably dynamically generated and preferably is generated upon a shared username and a password. The username may be, but not necessarily need to be, the public user identity of the user. The shared password is preferably randomly chosen by the AS 3, and sent along with the charging information and correlation information in the MESSAGE request.

On the UE 1 side, on reception of the MESSAGE request with the charging information and the password to be used to proceed with the SIP request, the UE 1 displays the charging information to the user. The UE 1 extracts also the correlation information that correlates the charging information contained in the MESSAGE request with the sent INVITE request. The UE 1 receives the authentication request (e.g. 407 response) with a challenge. If manual confirmation is configured in UE 1, said UE 1 requests confirmation from the user to proceed. If automatic confirmation is configured in UE1, said UE 1 waits for a configured period of time, after which said UE 1 automatically proceeds with the session setup. If the session proceeds, the UE 1 generates the credentials according to the password sent in the MESSAGE request. These credentials are sent in a new INVITE request.

Thus, in accordance with this embodiment, charging related information, correlation information, and a password are provided in one message, to the user. Further, an information such as e.g. an 407 Authorization Required message may be used to actually prompt the user to input information, e.g., by pressing or touching an input key, whether he would like to continue with the call setup, and if yes, include the provided password in the subsequent message, e.g., INVITE. Hence, usage of digest challenge is provided in this embodiment.

Figure 2:
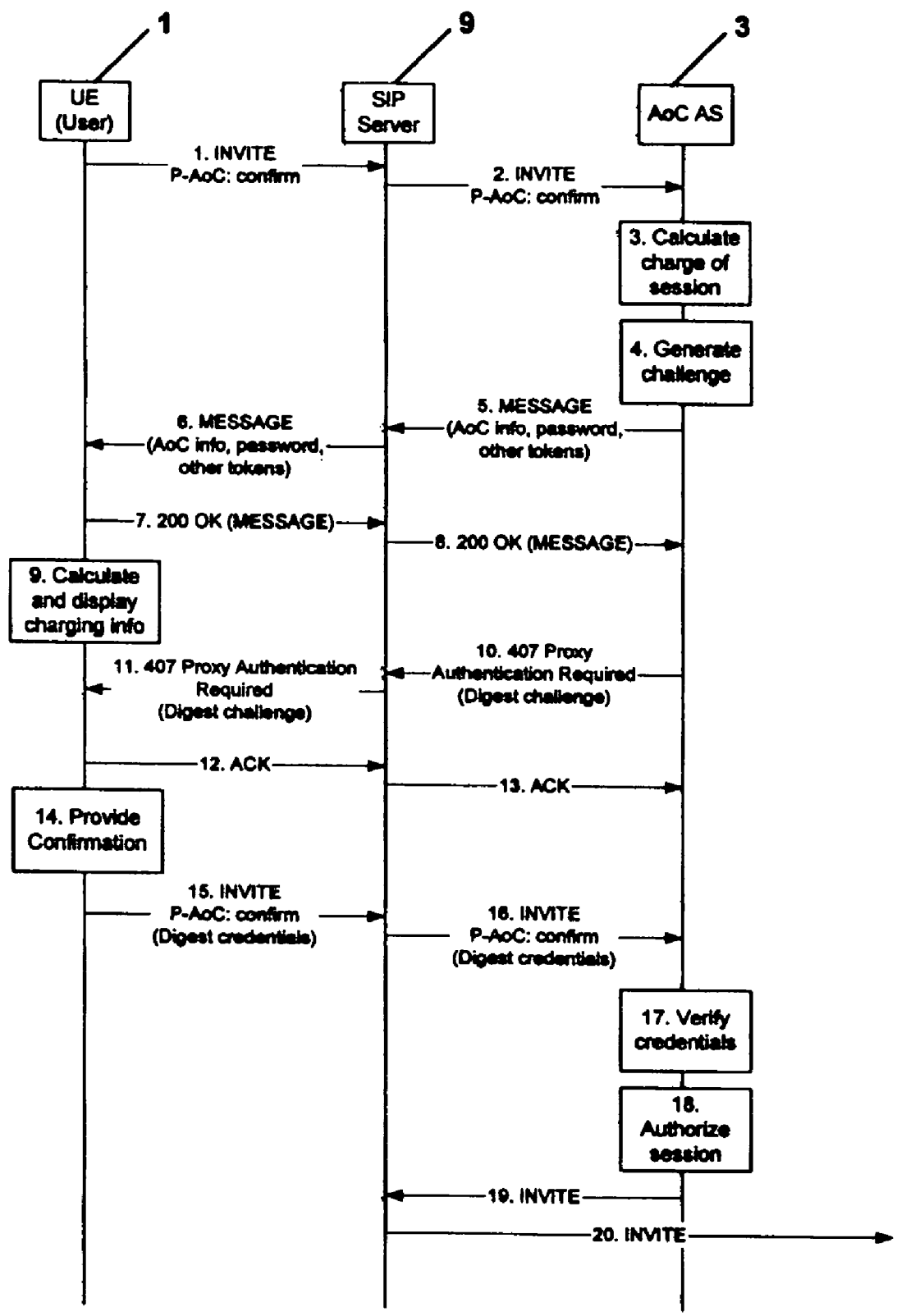
FIG. 2 illustrates an example of a call flow in embodiments of a system, method, and network elements of the invention in a case where a user requests a service such as AoC service in "confirm" mode with possibility of deciding on acceptance from the user.

FIG. 2 presents a call flow of a case where the user requests AoC service in "confirm" mode, requiring an acceptance from the user before continuing with the session.

FIG. 2 depicts an embodiment of a method of operation in accordance with the invention. If the user of UE 1 temporarily requests Advice of Charge, she or he adds an information, preferably a P-AOC header, to the INVITE request sent in step 1. Instead of an INVITE request, the user may send any other request, e.g., chargeable request. The header can contain, for instance, values "inform" or "confirm". The value "inform" indicates that the user wants to forcibly establish the session, independently of the charges derived of such session, but to get information of these charges. The value "confirm", as in FIG. 2, "P-AOC header: confirm", indicates that the user first wants to get the charging information, and after that the user will provide a confirmation if he wants to proceed with the session setup.

If the user has a permanent setting of either inform or confirm mode, the P-AOC header need not be present in the INVITE request of step 1.

In the case of FIG. 2, it is assumed that the request contains an indication that AoC is requested in "confirm" mode, that is, the user has to confirm that it wants to proceed with the request once the charge is known to the user. The SIP Server 9, which may be identical to the S-CSCF 2 of FIG. 1, receives the INVITE request of step 1. The SIP-Server 9 executes a filter criterion that controls forwarding those requests containing the AoC indication to the AoC AS. The SIP Server 9 accesses, or downloads, the e.g. initial filter criteria from the HSS 4 set for the user of UE 1. Upon receipt of the INVITE request of step 1, the SIP-Server 9 evaluates the criteria, e.g.

the initial filter criteria set for the user of UE 1, and as a result of that, forwards, in a step 2, the INVITE request to the AoC AS 3.

The AoC AS 3 inspects the INVITE request, including the session description, SDP, and calculates, in a step 3, the charges for this session. For this calculation the AoC AS 3 may need, and be adapted, to contact other servers, routers, media servers, GPRS nodes, packet data gateways, PSTN gateways, etc. for the purpose of gathering the requested charging information. The AoC AS 3 then examines the P-AOC header and, if the value is "confirm", generates, in a step 4, a randomly chosen password and a challenge, e.g. a temporary challenge, for that user and the generated password. This temporary challenge preferably is an HTTP Digest challenge/response combination that will be used later to challenge the user. The challenge/response-generated pair is generated upon a shared username and password combination. The password is preferable dynamically generated in the AoC application server. The password is needed for the UE to generate the response to the challenge. The username can be the public user identity of the user, whereas the password is just generated on the fly and only valid for a short time, after which, it expires and becomes invalid.

The AoC AS 3 then creates a MESSAGE request that contains the requested charging information and necessary information for the UE 1 to provide credentials, e.g., the password, that the user can use to authorize the processing of the request. The MESSAGE request also contains an identifier of the MESSGAGE contents, such as a specific body type. The information is structured in such way that it is understandable by the user equipment. Other tokens that help the UE to correlate the MESSAGE request containing charging information with the chargeable SIP request, if required, can be also present, e.g., Call-ID, From-tag of the related INVITE request, etc.

The MESSAGE request is sent, in step 5, to the SIP Server 9, and then routed, in step 6, to the UE 1 via the SIP Server 9. In steps 7, 8, acknowledgements messages may be returned to the SIP Server 9 and AS 3. In step 9, the UE 1 detects or calculates the charging information, based on the charging information received in the message of step 6, and displays, or otherwise informs, for example in acoustic form, the charging information to the user.

The AoC AS 3 then creates a challenge such as a Digest challenge and further generates a message such as a 407 (Proxy Authentication Required) response for the INVITE request which message includes the created challenge. The challenge is generated upon a combination of the username and the password, and typically upon a "nonce", which is a token valid for a short duration of time. There may also other conditions or parameters have impact on the challenge generation, such as the realm where the username/password is valid, the Request-URI, etc. The challenge does not include the username or the password in cleartext. This response is sent, in step 10 to the SIP server 9 and then forwarded to the UE 1, in step 11.

In steps 12, 13, acknowledgements messages may be returned to the SIP Server 9 and AS 3. This completes the INVITE transaction, meaning that if the user decides to not proceed with the session, there are no related stored state remaining in network elements.

When the message of step 11 is received, a step 14, "Provide confirmation" is carried out, in which the UE 1 e.g. waits for, or requests authorization or permission to proceed with the session setup. This authorization can be implemented manually or automatically depending on user preferences stored in the UE 1. In manual mode the authorization requires an explicit confirmation from the user, such as operating, e.g. pressing a keypad. The UE 1 displays a window with the charging information and requests confirmation from the user to proceed. The confirmation from the user may e.g. be provided by operating, e.g. pressing a key or keypad.

In automatic mode, the UE 1 can wait for a configured period of time for an explicit cancellation from the user; in absence of such cancellation the UE 1 automatically authorizes the session to proceed. As an example, in automatic mode, the UE 1 displays a window with the charging information showing the possibility to cancel the session setup. If the user does not cancel within some short period of time (e.g. 3 seconds), then the UE 1 automatically proceeds with the session setup. Thus, in automatic mode, the confirmation is coming from e.g. a timer, whereas, in the manual mode, the confirmation is coming from the user.

When the user accepts for example by inputting a confirmation into the UE 1, e.g. by operating a button or key, the UE 1 creates a response to the challenge, e.g. using the user's own username (public user identity), the password received in the MESSAGE request of step 6, and the Digest challenge received in the message of step 11.

Then the UE 1 creates, in step 15 a new message, e.g. an INVITE request, that includes the response to the challenge generated in step 14, for example Digest credentials (i.e., the response to the challenge generated according to the password received in the MESSAGE request of step 6, and the Digest challenge of step 11), preferably together with the P-AOC header field and the "confirm" value (in case of temporary settings). This message, e.g. INVITE request, of step 15 is also routed to the AoC AS 3 in step 16. The AoC AS 3 verifies, in step 17, the received response to the challenge, i.e. verifies the credentials. If the verification leads to a positive result, that is the received digest credentials are a proper result of the sent digest challenge and password etc, the AoC AS 3 authorizes the session to proceed, step 18. Then the AoC 3 forwards, in step 19, the INVITE request according to normal procedures back to the SIP Server 9, which will route it, in step 20 to its destination such CSCF 5 and UE 6 of FIG. 1.

When, in step 14, the user does not want to proceed with the session, and does not input a confirmation to proceed with the session within a defined time internal, or actively cancels the session set-up procedure, the session will be terminated. No further signalling is required, because the INVITE transaction is completed (with an ACK), and no state is kept in the AoC AS 3.

At any time, for the duration of the session or at the end of it, the AoC AS 3 can generate a new MESSAGE request (not shown in FIG. 2) similar to the message of step 5 with new charging information. For example, AoC AS 3 may send a new MESSAGE request after the price of a session has reached a predefined limit. As another example, the AoC AS 3 may send a new MESSAGE request once new media components (e.g., audio, video), new codecs have changed during the session, or new recipients of the session have been added (e.g., in an ad-hoc conference mode).

The AoC service can thus easily be implemented. The service may be divided into four aspects: Invocation of the service (permanent and temporary invocation); Provide information of the potential charges; Request or provide confirmation (automatic or manual) from the user whether to proceed with the session setup or not; Provide additional information of charges, if required, during mid-call or at the end of the call.

The invocation of the service in temporary mode is provided by including a filter criteria that forwards to the AoC AS 3 only those request that contain an indication to provide AoC (e.g., this indication could be a SIP P-header field or value). The presence of such information, e.g. a P-header in the INVITE request, in combination with a filter criterion that routes to the AoC AS 3 when the information or header is present, leads to invocation of the service. For permanent settings, only a filter criterion that routes all the session attempts (and other chargeable signalling) or all requests to the AoC AS 3 is required (no P-headers).

In order to provide information of the charges, the AoC AS 3 acts as a SIP User Agent by generating and sending MESSAGE requests that contain the available and requested charging information. The user receives these messages and they are rendered visible on the screen of the UE 1.

In this embodiment, the request for confirmation from the AS 3 to the user to proceed with the call is implemented as a request for an authorization to proceed with the session setup, as traditionally only done to request authorization in SIP. The user then examines the AoC information, and, when he agrees to proceed, this case is modelled with an INVITE request that contains the credentials to authorize the AS to proceed with the session setup.

Since the INVITE request for AoC is always routed through the AoC AS 3, it can keep on sending new MESSAGE requests periodically or whenever more accurate charging information is available, during the duration or at the end of the session.

The AoC AS 3 is behaving as both proxy (for chargeable SIP requests, such as INVITE) and User Agent (for sending MESSAGE requests with AOC information).

In accordance with embodiments of the invention, the Application Server is acting as a terminating endpoint for signalling originated at the user equipment, as an originating endpoint for signalling generated on behalf of the user equipment addressed to the destination of the request, maintaining locally stored state correlating the terminating and originating endpoint signalling information synchronized. This is sometimes referred as a Back-to-Back User Agent behaviour.

In accordance with embodiments of the invention, the Application Server is acting as a proxy server, forwarding requests received from the user equipment towards the intended recipient of the request.

Figure 3:
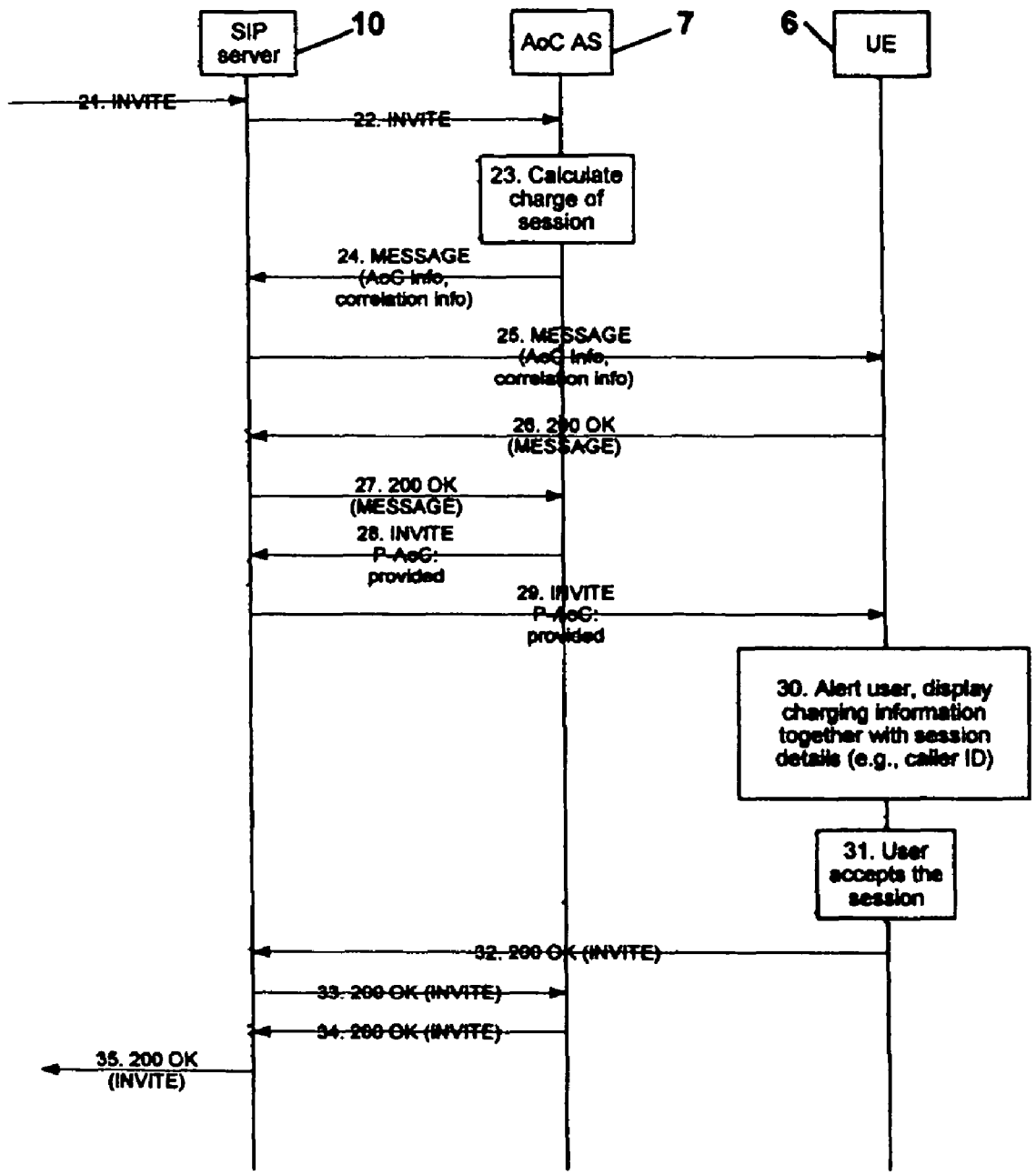
FIG. 3 shows an embodiment of a system, method, and devices in accordance with the invention, for providing a service such as the AoC service in the terminating side.
Figure 4:
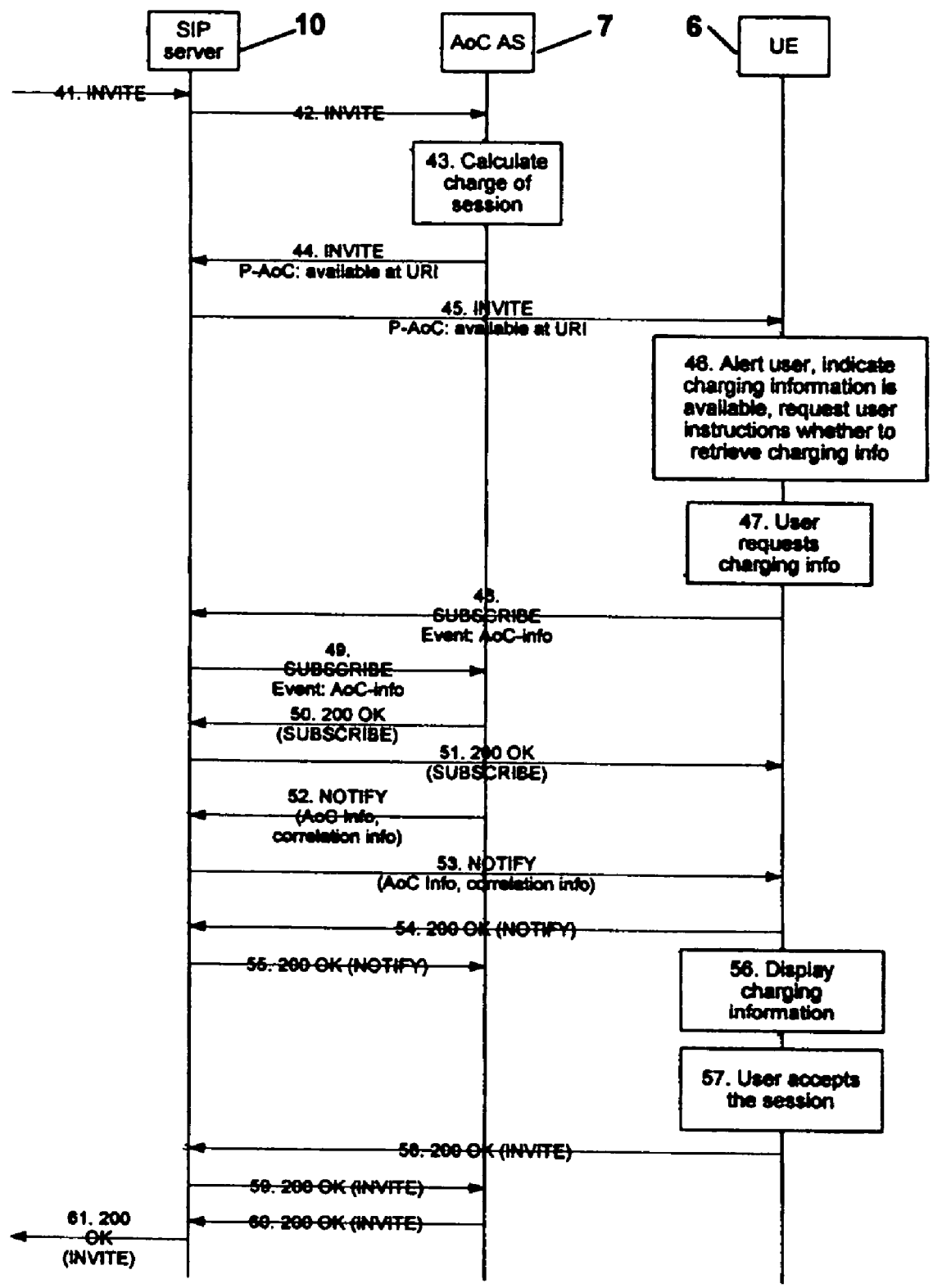
FIG. 4 shows another embodiment of a system, method, and devices in accordance with the invention, for providing a service such as the AoC service in the terminating side.

FIGS. 3, 4 show two embodiments for providing a supplementary service such as the AoC service in the terminating side, i.e. for UE 6. A SIP server 10 of FIGS. 3, 4 may correspond to, or be identical with the CSCF 5 and its arrangement shown in FIG. 1. The UE 6 and AoC AS 7 correspond to the respective elements shown in FIG. 1.

The provision of the supplementary service such as the AoC service in the terminating side, i.e. for UE 6, may be provided in addition to the AoC service for the originating side, or may be provided independently thereof in case no AoC service is invoked for the originating side. Likewise, the provision of the supplementary service such as the AoC service in the originating side, i.e. for UE 1, may be provided in addition to the AoC service for the terminating side, or may be provided independently thereof in case no AoC service is invoked for the terminating side.

The embodiment of FIG. 3 is based on a push operation. The AoC AS 7 sends an unsolicited MESSAGE request to the UE 6 that contains the requested charging information. This alternative is preferably employed for "permanent" mode in which the user of UE 6 is always informed on charges occurring when accepting every call or session.

In this case, there is a filter criterion configured in the SIP server 10 for this user or UE 6 so that all terminating session setups, and any other chargeable messages are forcibly routed to the AoC AS 7. In this case, there is no header needed that selects which messages to forward to the AoC AS 7. All of the messages are sent to this AoC AS 7.

According to FIG. 3, an INVITE request, step 21, arrives at the SIP server 10 that evaluates the filter criteria set for the user of UE 6. As a result of this evaluation, the SIP server 10 (CSCF-T) forwards, in step 22, the INVITE request to the AoC AS 7, which calculates, in step 23, charges for this session. The AoC AS 7 creates, in step 24, a MESSAGE request that contains the charging information and correlation information. This correlation information can contain the sender, destination, call-id, and any other parameter that helps the terminating UE 6 to correlate the charging information with the proper INVITE request. The MESSAGE request is sent, in step 25, from the SIP server 10 to the UE 6, which temporarily stores the contents of this message. The UE 6 generates an acknowledgment message, e.g. a 200 OK message, which is sent, in step 26, to the SIP server 10, and then forwarded, in step 27, to the AoC AS 7.

Also the AoC AS 7 creates a P-AOC header field indicating that the AoC information is provided separately, preferable by adding a "provided" tag to the P-AOC header field. For example, the header can be: P-AOC: provided. Then the AoC AS 7 inserts the generated header field in a request, e.g. an INVITE request, and proxies this request, e.g. INVITE request, in steps 28, 29 to the destination of the session, that is to the UE 6 via SIP server 10. When this INVITE request is received, in step 29, at the UE 6, it can determine that charging information has been provided (because of the P-AoC header field containing the "provided" tag). The UE 6 alerts, in step 30, the user displaying typical incoming session information (such as the call id), received in the INVITE request 29, but also displaying the charging information received in the MESSAGE request of step 25. If the user of UE 6 accepts the session, in step 31, an acknowledgment message, e.g. a 200 OK response is generated which is sent, in step 32, to the SIP server 10, and forwarded, in step 35, to the origin of the message of step 21, for example to the SIP server 9 of FIG. 2. In steps 33, 34, acknowledgment message may be exchanged between the SIP server 10 and the AoC AS 7.

If the user does not accept the session in step 31, and rejects the session, an appropriate response is generated (such as 488 "Not Acceptable Here" or 603 "Decline") so that the session will be cancelled.

The AS 7 can generate MESSAGE request containing information during the duration of the session or at the end of it, whenever newer or more accurate charging information is available.

The embodiment of FIG. 4 is based on a pull operation. The UE 6 is supplied with a Universal Resource Identifier, URI, that contains the charging information. The UE 6 can access this URI in order to receive the charging information. This embodiment is preferably implemented with a SUBSCRIBE/NOTIFY mechanism in SIP, but may also use an HTTP Web page.

This embodiment can work in both permanent and temporary mode. In permanent mode, the UE 6 is configured to retrieve the charging information automatically always. In temporary mode the UE 6 is configured to ask the user whether he wants to retrieve the charging information.

In permanent mode, there is preferably a filter criterion configured for the user of UE 6 so that all terminating session setups, and any other chargeable messages are forcibly routed to the AoC AS 7.

When there is no header that selects which messages to forward to the AoC AS 7, all of them are sent to this AoC AS 7.

A message such as an INVITE request is received, in step 41, at the SIP server 10 which evaluates the filter criteria set for the user of UE 6. As result of this evaluation, the SIP server 10 (CSCF-T of FIG. 1) forwards, in step 42, the INVITE to the AoC AS 7, which calculates, in step 43, charges for this session. The AoC AS 7 generates a P-AOC header field that contains an "available-at" tag, and a URI where the charging information can be retrieved. For example, the header can be:

P-AoC: available-at ="sip:aoc-server.example.com"; or

P-AOC: available-at ="http://aoc-server.example.com/user34/session43".

Then the AS 7 includes this header in the message to be sent in step 44, e.g. INVITE request, and proxies the message, in steps 44, 45 via SIP server 10 en-route to its destination, UE 6. When the UE 6 receives the message, e.g. INVITE request, it alerts the user about the incoming call (displaying caller ID, media components, etc.) and informs the user that charging information is available, giving the user a chance to indicate whether he wants to retrieve such information.

At this time, the actions of the user with respect to the INVITE and the AoC info are not related anymore: the user can accept the session setup, but not the AoC info; or it can do it in the reverse order, accepts to retrieve the AoC info, wait until the information is available, and the accepts the session setup; or it can deny both or just one. All the combinations are possible. The call flow in FIG. 4 just shows the case when the user first retrieves the charging info and second accepts the session setup.

When the user requests, in step 47, to retrieve the charging information the UE 6 analyzes the URI included in the "available-at" parameter of the P-AOC header field and, if it is a SIP URI, sends a SUBSCRIBE request, steps 48, 49, towards that URI, requesting a subscription to the AoC-info event package. In case the parameter is an HTTP URI the UE sends an HTTP GET request towards this URI (not shown in the flow diagram of FIG. 4).

Then the AoC AS 7 receives the SUBSCRIBE request, in step 49, and generates a message such as a NOTIFY request that contains the charging information and the correlation information, and is sent, in step 52, to the SIP server 10. Such messages are generated whenever new or more accurate charging information is available. This information is forwarded, in step 53, from the SIP server 10 to the UE 6, which is able to display the charging information to the user. When the user decides, in step 57, to agree to the session setup, an accept message such as a 200 OK is generated and returned, in step 58, to SIP server 10. The SIP server 10 then sends accept messages such as 200 OK (INVITE) messages to the AoC AS 7, step 59, and, in step 61, to the network element which had sent the request of message 41, that is for example the SIP server 9 of FIG. 2 or the CSCF 2 of FIG. 1.

In the terminating case such as shown in FIGS. 3, 4, both INVITE and MESSAGE requests (messages of steps 21, 25, or 41, 45) are going towards, or related to, B party, i.e. UE 6.

According to another embodiment of the invention, only a single request containing the requested information is generated at the AS. As an example, the AoC-AS 7 just includes charging information in the proxied SIP request, such as into P-AOC header field of the INVITE request, sent to the terminating equipment UE 6. No separate MESSAGE request is needed, since the INVITE request contains all the available charging information in a P-AOC header field. Further, no correlation is needed, since the charging request is included in the own session setup request (e.g., INVITE request).

The invention is not only applicable to session setup requests or requests of other type with SIP (e.g., INVITE requests), but also to any other form of requests such as chargeable SIP requests (e.g., SUBSCRIBE, PUBLISH, MESSAGE).

Further, a number of intermediary network elements may be located in between those network elements described above and shown in FIGS. 1 to 4. Particularly, there can be P-CSCFs, I-CSCFs, Session Border Controllers, Subscriber Location Functions and other elements that have been omitted for the sake of clarity.

In the following, an example of a P-AOC header is described. Instead of such a header, any other appropriate header or information can be used and sent to the AS 3 for informing it on the request for charging information and the possibility to confirm the session upon receipt of the charging information. The P-AOC header may be a SIP header having for instance the below described semantics. The syntax of the header may for example be expressed according to the Augmented Backus-Naur Form (BNF) as described in RFC-2234. The header extends the "message-header" of SIP defined in RFC 3261 Section 25.1:

message-header=P-AOC,

P-AOC="P-AoC" HCOLON ("information"/"confirmation"/"provided"/"available-at"=URI/"charging-info"=INFO/token).

Examples of this header in SIP requests:

P-AoC: information

P-AoC: confirmation

P-AoC: provided

P-AoC: available-at ="sip:aoc-server.example.com"

P-AoC: charging-info=<charging-information>

The "information" tag ("info" in the above described embodiment) provides instructions to the AoC Application Server 3 to provide regular information of the charges of the call, but the session setup is not stopped to provide this information. The "confirmation" tag ("confirm" in the above described embodiment) provides instructions to the AoC Application Server 3 to temporarily suspend the processing of the INVITE request, provide charging information to the user, and wait for a confirmation from the user before proceeding with the session setup. If the user does not confirm the session setup (within a determined period of time), the AoC AS 3 should discard any previously stored state information.

The "provided" tag informs a terminating user equipment that charging information has been dispatched in a companion message. The "available-at" tag provides the terminating user equipment with a URI where the charging information can be retrieved. The "charging-info" tag provides the available charging cost information, either as a complete monetary unit, or as break down cost.

In an embodiment, a user may set a price limit at UE 1 or 6 (e.g. 0.50 €/min). The UE generates said confirmation of proceeding with the session set-up, or the session automatically every time the charge indicated in the charging information to the UE is under this limit. This allows a kind of individual price supervision for e.g. children.

Embodiments of the invention may as an example include one or more of the following features either alone or in arbitrary combination. A "confirmation" feature may be provided in AoC. AoC can be requested per call basis in session setup. Features:

detecting/requesting that a supplementary service is to be provided for a session of a communication service (not mandatory in UE), transmitting/receiving information for the supplementary service and authorization information (to/at UE), generating/verifying a confirmation, using/including the authorization information.

In the above, an AoC service was described as an example of a supplementary service to which the invention can be applied. The present invention is not restricted to an AoC service but may also be used for a service or supplementary call service of any other type. The invention is useful and applicable for any other service which sends information to the user and permits the user to decide on continuing with use of the requested session or service. As an example, the invention can be used with a call forwarding service or ringing tone downloading service or any other downloading service.

Embodiments of the invention include one or more of the following features either alone or in any arbitrary combination.

A system for providing a service, e.g. a supplementary service which may e.g. be provided for another service such as a communication service, and may e.g. be requested at a session set-up of a communication service or during a session, or at the end of said another service such as the communication service.

The system preferably comprises an application server providing information for the supplementary service to a user equipment.

The application server is preferably adapted to generate authorisation information and to send the generated authorisation information, and the information for the requested supplementary service to the user equipment.

The user equipment is preferably adapted to provide information for the requested supplementary service to a user of the user equipment, to generate an authorisation response based on the received authorisation information, and to send the generated authorisation response to the application server for verification.

The application server is preferably adapted to verify the response and to decide on further proceeding with the communication service.

The supplementary service preferably is an advice of charge, AoC, service.

The user equipment is preferably adapted to generate the authorisation response depending on an input by the user, or automatically.

The user equipment is preferably adapted to generate the authorisation response automatically after expiry of a defined time interval when not receiving an input by the user.

The application server is preferably adapted to receive at least part of the information for the requested supplementary service from at least one further entity.

The application server is preferably adapted to receive at least part of the information for the requested supplementary service via an interface to charging elements.

The authorisation information generated by the application server preferably includes at least one of a username, a password and a challenge.

The application server is preferably adapted to send parts of the authorisation information to the user equipment in different messages generated by the application server.

The application server is preferably adapted to send, to the user equipment, a first message including charging information, a password, and correlation information, and, if requested by the user, a second message which is an authentication request with a challenge to be used in case the user equipment is configured, or the user instructs the user equipment, to proceed with the requested session set-up or session.

The user equipment is preferably adapted to request a communication service which also requests a supplementary service to the communication service.

The request for a supplementary service preferably comprises:

request to the supplementary service to gather, generate, and send additional information related to the said communication service to the user equipment; and/or request for the supplementary service to hold processing of the communication service until the user has confirmed, or not cancelled, the usage of the communication service. The request for a supplementary service preferably comprises:

request to the supplementary service to gather, generate, and send additional information related to the said communication service to the user equipment; and/or a request for the supplementary service to proceed processing of the communication service.

The user equipment is preferably adapted to send a communication service session set-up message to the application server which message includes a response to a challenge included in the authorisation information.

The application server is preferably adapted to verify the appropriateness of the response to the challenge, and to proceed with the session setup of the communication service depending on the verification result.

The step of proceeding with the session setup preferably comprises further forwarding of the session setup of the communication service en route to destination.

The step of proceeding with the session setup may also comprise:

acting as a terminating endpoint from the signalling for the said session setup of a communication service;

acting as an originating endpoint for signalling for a new session setup of a communication service, including generating a new session setup of the communication service addressed to the destination of the communication service; and/or correlating the information between the terminating and originating endpoints of the session setup of the communication service.

The user equipment is preferably adapted to inform or display, in response to the first message, the charging information to the user, and, in case the user has previously configured the user equipment to automatically proceed, or the user instructs the user equipment to proceed with the requested session set-up or session of a communication service, to generate the authorisation response to the second message based on the password, and to send the generated authorisation response to the application server.

The user equipment may also preferably be adapted to inform the user of the user equipment on the received information for the requested supplementary service, and to:

wait for confirmation from the user of the user equipment for continuing with the session or session set-up of the communication service; or wait for a configured period of time in which the user is able to cancel the requested communication service; in absence of such cancellation at the end of the said period of time the user equipment is adapted to automatically generate the said confirmation.

The user equipment may be adapted to generate or send the authorisation response only after receiving the requested confirmation from the user of the user equipment for continuing with the session or session set-up of the communication service.

The user equipment may be adapted to generate or send the authorisation response after a configured period of time has expired without explicit cancellation from the user.

The information for the requested supplementary service may be price information.

The user equipment may be adapted to compare the price information with a predetermined limit, and to generate or send the authorisation response automatically if the price is under the predetermined limit.

A server may be provided which forwards the messages between the user equipment and the application server.

The server may be adapted to check, when receiving a session set-up request for a communication service from the user equipment, filter criteria stored for a user of the user equipment for deciding on forwarding a message from the user equipment to the application server.

The charging information may be attached to a session setup message.

A system may also be configured for providing a supplementary service at a session set-up of a communication service or during a session of said communication service.

The system may comprise an application server providing information for the requested supplementary service to a user equipment.

The application server preferably is adapted to send, or initiate the sending of, the information for the requested supplementary service to the user equipment.

The user equipment may be adapted to provide information for the requested supplementary service to a user of the user equipment and to further proceed with the communication service either automatically or after receipt of a confirmation by the user.

The application server may be adapted to send a first message including charging information to a server which forwards the message to the user equipment, and then a second message informing the user equipment that charging information has been provided, to the server for forwarding the second message to the user equipment which is adapted to inform the user on the charging information received in the first message.

The application server may also be adapted to send a first message including an address at which charging information is available, to the user equipment or to a server which forwards the message to the user equipment, and when the user equipment requests charging information, to access the address for receiving the charging information and to send it to the user equipment or to the server for forwarding the charging information to the user equipment which is adapted to inform the user on the charging information.

A method for providing a supplementary service requested at a session set-up of a communication service or during a session of said communication service, may provide information for the requested supplementary service to a user equipment.

An application server may generate authorisation information and send the generated authorisation information, and the information for the requested supplementary service to the user equipment, wherein the user equipment provides information for the requested supplementary service to a user of the user equipment, generates an authorisation response based on the received authorisation information, and sends the generated authorisation response to the application server for verification.

The application server may verify the response and decide on further proceeding with the communication service.

A user equipment may be provided for use with a system for providing a supplementary service requested by the user equipment at a session set-up or during a session of a communication service.

The user equipment is may be adapted to receive the information for the requested supplementary service, and authorisation information from the application server, to provide information for the requested supplementary service to a user of the user equipment, to generate, depending on an input by the user or depending on a configured timer, an authorisation response based on the received authorisation information, and to send the generated authorisation response to the application server for verification.

The user equipment may be adapted to generate a session setup of a communication service wherein the session setup further comprises a request for a supplementary service.

The user equipment may be adapted to generate an indication of whether the said request for the supplementary service must interrupt the setup of the communication service or not.

The user equipment may be adapted to inform or display, in response to the receipt of a first message including charging information, the charging information to the user, and, in case the user equipment is adapted to proceed, or the user instructs the user equipment to proceed, with the requested session set-up or session.

The user equipment may be adapted to to generate the authorisation response to an authentication request including a challenge, based on a password which may have been received in a message such as the first message, and to send the generated authorisation response to a network entity such as the application server.

The user equipment may be adapted to inform the user of the user equipment on the received information for the requested service, and to wait for confirmation from the user of the user equipment for continuing with the session or session set-up of the communication service.

The user equipment may be adapted to generate or send the authorisation response only after at least one of:

receiving the requested confirmation from the user of the user equipment for continuing with the session or session set-up, expiring of a timer controlling a period of time enabling user cancellation of the communication service, for continuing with the session or session set-up.

A user equipment may be used for providing a supplementary service at a session set-up of a communication service or during a session of said communication service.

The user equipment may be adapted to receive information for the requested supplementary service, to provide information for the requested supplementary service to a user of the user equipment, and to further proceed with the communication service either automatically or after receipt of a confirmation by the user.

The user equipment may be adapted to receive a first message including charging information, and then a second message informing the user equipment that charging information has been provided.

The user equipment may be adapted to inform the user on the charging information received in the first message.

The user equipment may be adapted to receive a first message including an address at which charging information is available, and when the user equipment requests charging information, to receive the charging information stored at the address, and to inform the user on the charging information.

An application server may be provided for use with a system for providing a supplementary service requested at a session set-up or during a session of a communication service.

The application server may be adapted to provide information for the requested supplementary service to the user equipment in relation with the said communication service.

The application server may be adapted to generate authorisation information and to send the generated authorisation information, and the information for the requested service to the user equipment, and to receive an authorisation response for verification.

The application server may be adapted to verify a authorisation response received from the user equipment and to decide on further proceeding with the session set-up or the session of the communication service.

Although preferred embodiments have been described above, the invention is not limited thereto and may also be implemented in network elements, networks or structures of different types.

The invention claimed is:

1. A system, comprising:
an application server providing information for a requested supplementary service to a user equipment, wherein the application server is configured to generate authorization information comprising a password and to send, in a message according to a session initiation protocol, the generated authorization information and the information for the requested supplementary service to the user equipment,
wherein the user equipment is configured to receive an authentication request, according to the session initiation protocol, responsive to a first request sent according to the session initiation protocol,
wherein the user equipment is configured to provide information for the requested supplementary service to a user of the user equipment, to generate an authorization response based on the password received in the authorization information, and to send the generated authorization response to the application server for verification in a second request according to the session initiation protocol, wherein the second request comprises the first request and the generated authorization response, and
wherein the application server is configured to verify the authorization response and to decide on further proceeding with a communication service.

2. The system according to claim 1, wherein the application server is configured to receive at least part of the information for the requested supplementary service from at least one further entity.

3. The system according to claim 1, wherein the first and the second requests are session initiation protocol (SIP) INVITE requests.

4. A method, comprising:
providing, by an application server, information for a supplementary service to a user equipment, the application server generating authorization information comprising a password and sending, in a message according to a session initiation protocol, the generated authorization information and the information for the supplementary service to the user equipment;
receiving, by the user equipment, an authentication request according to the session initiation protocol, responsive to a first request sent according to the session initiation protocol;
providing, by the user equipment, information for the supplementary service to a user of the user equipment, generating an authorization response based on the password received in the authorization information, and sending the generated authorization response to the application server for verification in a second request according to the session initiation protocol, wherein the second request comprises the first request and the generated authorization response; and
verifying, by the application server, the response and deciding on further proceeding with a communication service.

5. The method according to claim 4, wherein the supplementary service is an advice of charge service.

6. The method according to claim 4, further comprising generating, by the user equipment, the authorization response depending on an input by the user or automatically.

7. The method according to claim 4, further comprising generating, by the user equipment, the authorization response automatically after expiry of a defined time interval when an input by the user is not received.

8. The method according to claim 4, further comprising receiving, by the application server, at least part of the information for the requested supplementary service from at least one further entity.

9. The method according to claim 4, further comprising including at least one of a username, a password and a challenge in the authorization information generated by the application server.

10. The method according to claim 4, further comprising sending, by the application server, parts of the authorization information to the user equipment in different messages generated by the application server.

11. The method according to claim 4, further comprising sending, by the application server to the user equipment, a first message including charging information, a password, and correlation information, and a second message which is an authentication request with a challenge to be used in case the user equipment is configured, or the user instructs the user equipment, to proceed with the requested session set-up or session.

12. The method according to claim 11, further comprising by the user equipment:
informing or displaying, in response to the first message, the charging information to the user;
generating, in case the user has previously configured the user equipment to automatically proceed, or the user instructs the user equipment to proceed with the requested session set-up or session of a communication service, the authorization response to the second message based on the password; and
sending the generated authorization response to the application server.

13. The method according to claim 4, further comprising requesting, by the user equipment, the communication service for which the supplementary service is provided.

14. The method according to claim 13, comprising:
requesting for the supplementary service to hold processing of the communication service until a confirmation is received to proceed with the communication service.

15. The method according to claim 4, further comprising sending, by the user equipment, said authorization response in a communication service session set-up message.

16. The method according to claim 15, further comprising constructing said communication service session set-up message based on an original request for said communication service session.

17. The method according to claim 4, wherein further proceeding with a session setup comprises forwarding of the session setup of the communication service en route to a destination.

18. The method according to claim 17, wherein the proceeding with the session setup comprises:
- acting as a terminating endpoint from a signalling for the session setup of a communication service;
- acting as an originating endpoint to signal for a new session setup of the communication service, including generating a new session setup of the communication service addressed to the destination of the communication service; and
- correlating the information between the terminating and originating endpoints of the session setup of the communication service.

19. The method according to claim 4, further comprising:
- informing, by the user equipment, the user of the user equipment on the received information for the requested supplementary service;
- waiting for confirmation from the user of the user equipment to continue with the session or session set-up of the communication service; and
- generating or sending the authorization response only after receiving the requested confirmation.

20. The method according to claim 4, further comprising:
- informing, by the user equipment, the user of the user equipment about the received information for the requested supplementary service; and
- waiting for a configured period of time in which the user is able to cancel the requested communication service, wherein in absence of such cancellation at the end of the period of time the user equipment automatically generates the confirmation.

21. The method according to claim 4, wherein the information for the requested supplementary service is charge information, the method further comprising:
- comparing, by the user equipment, the charge information with a predetermined limit; and
- generating or sending the authorization response automatically when the charge is under, or does not exceed, the predetermined limit.

22. The method according to claim 4, further comprising using filter criteria stored for a user of the user equipment to decide on providing the supplementary service.

23. The method according to claim 4, wherein the first and the second requests are session initiation protocol (SIP) INVITE requests.

24. An apparatus, comprising:
- a receiver configured to receive in a message according to a session initiation protocol information for a supplementary service and authorization information comprising a password;
- a processor configured to provide information for the supplementary service to a user of the apparatus,
- wherein the receiver is configured to receive an authentication request according to the session initiation protocol, responsive to a first request sent according to the session initiation protocol,
- wherein the processor is configured to generate, preferably depending on preconditions met, an authorization response based on the password received in the authorization information; and
- a transmitter configured to send the generated authorization response for verification in a second request according to the session initiation protocol, wherein the second request comprises the first request and the generated authorization response.

25. The apparatus according to claim 24, wherein the service is an advice of charge service.

26. The apparatus according to claim 24, wherein said precondition is one of an input by the user and expiry of a timer together with absence of cancellation by the user.

27. The apparatus according to claim 24, wherein the apparatus is configured to send said authorization response in a communication service session set-up message.

28. The apparatus according to claim 27, wherein said communication service session set-up message is constructed based on an original request for said communication service session.

29. The apparatus according to claim 24, wherein the apparatus is configured to generate a session setup of a communication service, wherein the session setup further comprises a request for a supplementary service.

30. The apparatus according to claim 24, wherein the apparatus is configured to generate an indication of whether the request for the supplementary service must interrupt the setup of the communication service or not.

31. The apparatus according to 24, wherein the apparatus is configured to inform the user of the apparatus about the received information for the requested service, and to wait for confirmation from the user of the apparatus to continue with the session or session set-up of the communication service.

32. The apparatus according to claim 31, wherein the apparatus is configured to generate or send the authorization response only after at least one of receiving the requested confirmation from the user of the apparatus to continue with the session or session set-up or expiring a timer controlling a period of time enabling user cancellation of the communication service, to continue with the session or session set-up.

33. The apparatus according to claim 24, wherein the first and the second requests are session initiation protocol (SIP) INVITE requests.

34. An apparatus, comprising:
- a transmitter configured to provide information for a requested supplementary service, based on a first request, -to a user equipment in relation with a communication service;
- a processor configured to generate authorization information comprising a password and to send, in a message according to a session initiation protocol, the generated authorization information and the information for the requested service to the user equipment;
- a receiver configured to receive an authorization response for verification in a second request comprising the first request according to the session initiation protocol,
- wherein the processor is configured to verify an authorization response received from the user equipment and to decide on further proceeding with the session set-up or the session of the communication service.

35. The apparatus according to claim 34, wherein the service is an advice of charge service.

36. The apparatus according to claim 34, wherein the apparatus is configured to receive at least part of the information for the requested supplementary service from at least one further entity.

37. The apparatus according to claim 34, wherein the apparatus is configured to send parts of the authorization information to the user equipment in different messages.

38. The apparatus according to claim 34, wherein the apparatus is configured to send, to the user equipment, a first message including charging information and a password, and a second message which is an authentication request with a challenge to be used in case the user instructs the user equipment to proceed with the requested session set-up or session.

39. The apparatus according to claim 34, wherein the first and the second requests are session initiation protocol (SIP) INVITE requests.

* * * * *